United States Patent

[11] 3,592,074

| [72] | Inventors | Carl M. Petersen, III<br>Pontiac;<br>William C. Wehner, Detroit, both of, Mich. |
|---|---|---|
| [21] | Appl. No | 848,957 |
| [22] | Filed | Aug. 11, 1969 |
| [45] | Patented | July 13, 1971 |
| [73] | Assignee | International Engineering Service, Inc.<br>Birmingham, Mich. |

[54] REMOTE-CONTROLLED MIRROR
10 Claims, 5 Drawing Figs.

[52] U.S. Cl. .................................................... 74/491,
74/501 M
[51] Int. Cl. .................................................. G05g 1/08
[50] Field of Search ........................................... 74/491,
504, 503, 501

[56] References Cited
UNITED STATES PATENTS

| 2,896,472 | 7/1959 | Starbird et al. ............... | 74/491 |
| 2,917,972 | 12/1959 | Bonaguro ..................... | 74/491 X |
| 3,251,238 | 5/1966 | Fugua ........................... | 74/491 X |
| 3,306,696 | 2/1967 | Tann .............................. | 74/491 X |

Primary Examiner—Milton Kaufman
Attorney—Hauke, Gifford & Patalidis

ABSTRACT: A remote-controlled mirror assembly for an automotive vehicle having a mirror housing with a base for attachment to the outside of the vehicle and a remote control for attachment to the vehicle and a remote control for attachment to the vehicle structure in the passenger compartment of the vehicle. A mirror is pivotally mounted on a control mechanism that is slidably and rotatably mounted on the housing, with the remote control connected to the control mechanism by a single connecting cable. Sliding motion of the control mechanism by means of the remote control and cable pivots the mirror about a first axis contained in the plane of the mirror, while rotary motion of the control mechanism by means of the remote control and cable pivots the mirror about a second axis contained in the plane of the mirror and substantially perpendicular to the first axis.

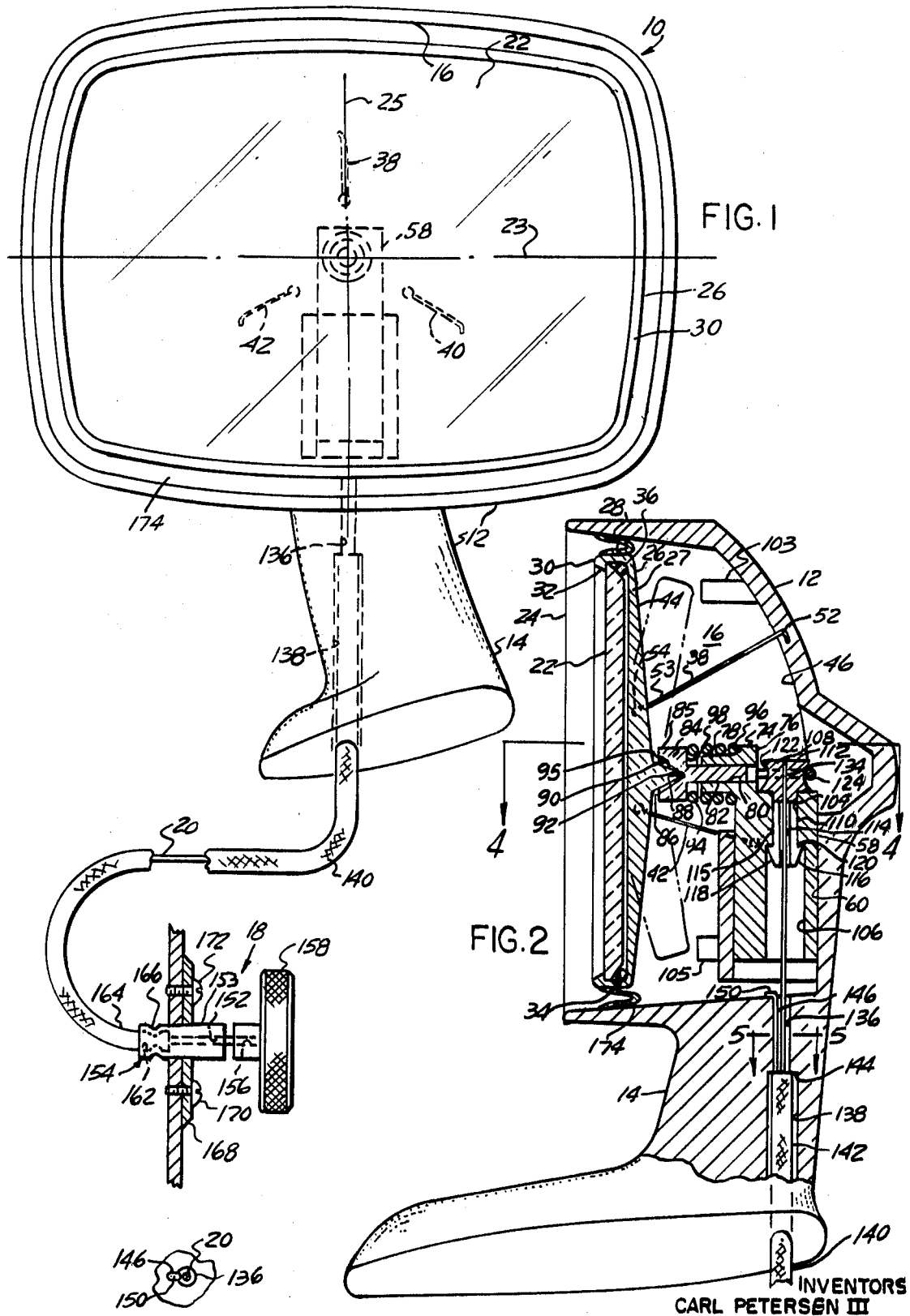

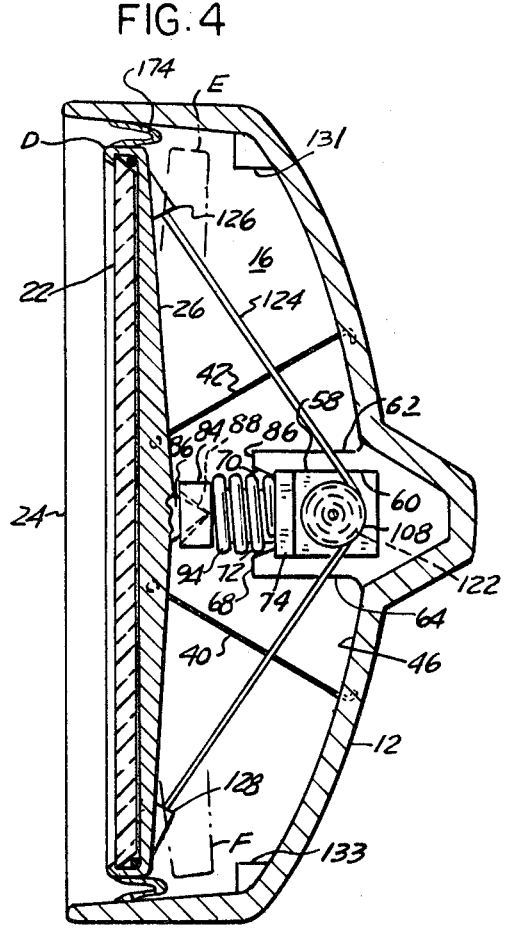
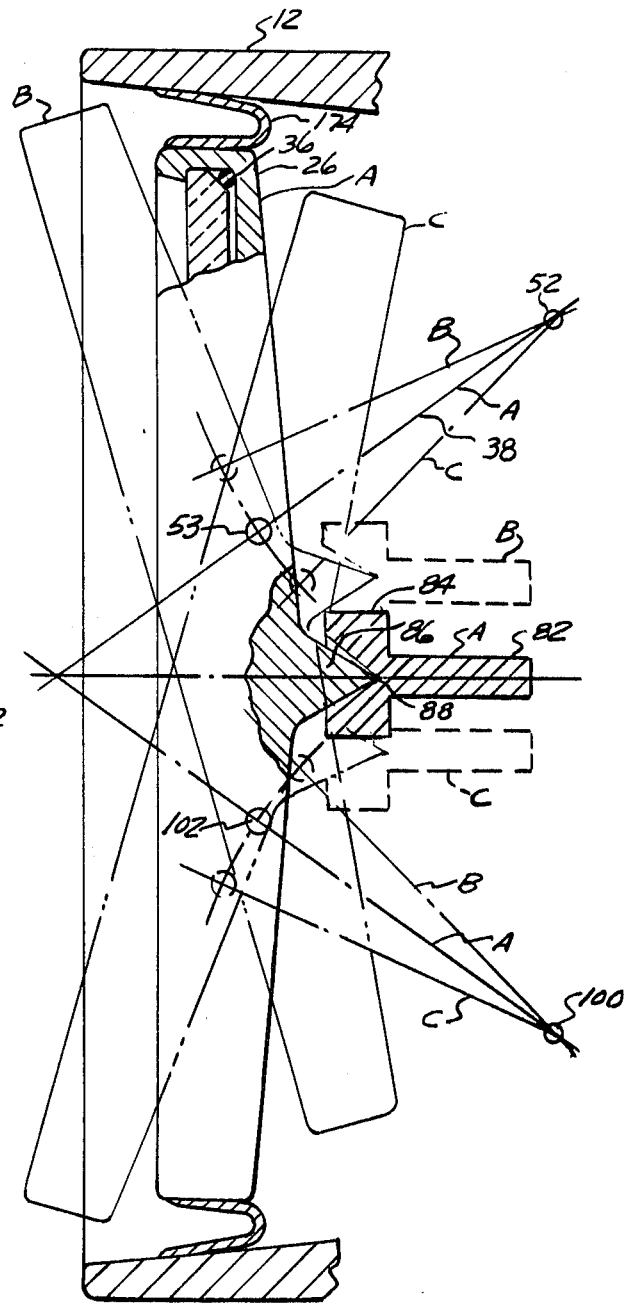

3,592,074

REMOTE-CONTROLLED MIRROR

BACKGROUND OF THE INVENTION

1. Field of the Invention

This invention relates to remote-controlled mirrors and more particularly to a easily installed remote-controlled mirror wherein the remote control mechanism operates the mirror through a single connecting member.

2. Description of the Prior Art

Various types of remote-controlled mirrors for automotive vehicles have been designed wherein the plane of orientation of the mirror can be controlled through a remote control mechanism positioned within the vehicle passenger compartment. Many of the present day remote-controlled mirrors have a remote control mechanism consisting of a protruding stick connected to the rear surface of a pivotally mounted mirror through a plurality of cables. As the position of the stick is changed the plane of orientation of the mirror is varied through the plurality of cables.

This type of remote-controlled mirror has the disadvantage of requiring a plurality of connecting cables between the remote control mechanism and the mirror, adding both to the expense of the remote-controlled mirror and to the difficulty of assembling the mechanism on a vehicle structure.

SUMMARY OF THE INVENTION

The present invention overcomes this difficulty of the prior art by providing a zero-backlash, snap-in construction remote-controlled mirror having a single connecting member between the remote control mechanism and the mirror. As in the prior art this remote-controlled mirror includes a mirror housing having a base for attachment to the exterior of an automotive vehicle and a remote control mechanism positioned in the passenger compartment of the vehicle.

A mirror is connected to the housing by a plurality of cables forming a tripod like suspension and is pivotally mounted on a control block, that is slidably mounted on the housing, so that as the control block is slidably moved the mirror pivots about a first axis contained in the plane of the mirror. A control pulley is rotatably mounted on the control block and connected to the mirror by means of a rubber cable, which engages the pulley and has its two ends connected to opposed outer extremities of the mirror, such that rotation of the pulley acts on the mirror through the cable to rotate the mirror about a second axis in the plane of the mirror and substantially perpendicular to the first axis.

A connecting cable has one end connected to the control pulley and the other end connected to a control knob forming a part of the remote control mechanism. Rotation of the knob is transmitted to the pulley by the connecting cable, resulting in pivoting the mirror about the second axis. Longitudinal or push-pull displacement of the control knob is transferred through the control cable to the control pulley, resulting in sliding motion of the control pulley and the control block. The sliding motion of the control block results in the mirror being rotated about the first axis.

This type of remote controlled mirror thus eliminates the need for multiple connecting cables between the remote control mechanism and the mirror. Therefore, a substantial reduction in the cost of the remote-controlled mirror unit is possible.

DESCRIPTION OF THE DRAWINGS S

FIG. 1 is a front view of the mirror showing the connection between the remote control mechanism and the mirror unit;

FIG. 2 is a side elevation view partly in section, showing the assembly of elements within the housing cavity;

FIG. 3 is an enlarged side elevation view of the mirror, showing three different positions which may be assumed by the mirror;

FIG. 4 is a section view taken along line 4—4 of FIG. 2; and

FIG. 5 is a section view taken along line 5—5 of FIG. 2.

DESCRIPTION OF THE PREFERRED EMBODIMENT

Referring now to FIGS. 1 and 2 a remote-controlled mirror generally indicated at 10 includes a housing 12 having an L-shaped base 14 for attachment to the exterior of a motor vehicle. The housing 12 includes a generally rectangular shaped cavity 16 formed at the upper portion of the base 14. A remote control 18, which may be attached to the interior of the motor vehicle, is connected to the cavity 16 through a connecting cable 20, such that a mirror 22 disposed within the cavity 16 of the housing 12 may be controlled by the remote control 18 from within the vehicle.

The generally rectangular mirror 22 is disposed within the cavity 16 with its reflective surface facing the generally rectangular opening 24 of the cavity. The mirror 22 shown in FIG. 1 with arbitrarily designated horizontal axis of rotation 23 and vertical axis of rotation 25 is supported generally flat rectangular retaining casing 26, preferably made of plastic, disposed within the cavity 16 adjacent opening 24. The mirror casing 26 is formed with a generally flat back member 27 having a flange 28 around its outer edge substantially perpendicular to the plane of the back member. An inwardly turned retaining flange 30 is formed around the free edge of the flange 28 for clamping the mirror 22 to maintain the mirror adjacent the back member 27. The inner edge of the retaining flange 30 forms an inwardly slanting ramp 32 to aid in inserting the mirror 22 between the flange 30 and the back member 27. An outwardly slanting ramp 34 is formed around the edge of the mirror 22 adjacent the nonreflective side of the mirror to further aid in the insertion of the mirror. As the mirror 22 is inserted between the back member 27 and flange 30, the ramp 34 engages the ramp 32 to push retaining the flange 30 outwardly by bending the flanges 28 outwardly. When the mirror 22 has been inserted, the flange 28 snaps back to its original position causing the retaining flange 30 to engage the reflective side of the mirror, clamping the mirror between the flange 30 and the member 27. A resilient O-ring 36, preferably made of rubber, is disposed along the inside of the corner formed by the member 27 and the flange 28 so as to resiliently engage the ramp 34 of the mirror 22, urging the mirror toward the retaining flange 30 to maintain a snug fit therebetween, preventing water and other debris from becoming lodged behind the mirror.

Referring to FIGS. 1—2 and 4, THE mirror-retaining casing 26 is partially supported by three cables 38, 40 and 42, preferably formed from piano wire or the like, connected between the back surface 44 of the casing 26 and the rear wall 46 of the cavity 22, in a tripod like suspension arrangement. As illustrated in FIG. 1, the three cables are preferably contained in three planes which intersect in a line perpendicular to the plane of the mirror 22 at the point of intersection of the two axes 23 and 25 of the mirror and are angularly disposed at 120° with respect to one another. As illustrated in FIG. 2 with respect to cable 38, one end of the cable is secured to the rear wall 46 of the housing 12., preferably by embedding therein as shown at 52. The other end 53 of the cable 38 is secured to the back side of the mirror casing 26 by means of loop formed thereon introduced in a slit or by other convenient means. The other two cables 40 and 42 are connected in like manner between the rear wall 46 of the housing 12 and the mirror casing 26.

A parallelepipedonal control block 58 having its axis of elongation substantially vertically disposed is vertically slidably mounted in a guideway 60 within the cavity 16 adjacent the rear wall 46 of the housing 12. Referring to FIG. 4, the guideway 60 is formed by a pair of parallel flanges 62 and 64, preferably formed from plastic, disposed in a pair of vertical planes and extending outwardly from the wall 46. A pair of inturned retaining flanges 66 and 68 are formed on the free ends of flanges 62 and 64 and have inwardly slanting ramps 70 and 72, respectively, aiding in the insertion of the control block 58 into the guideway 60. As the control block 58 is inserted into the guideway 60 through the opening formed between the inturned retaining flanges 66 and 68, the block engages the ramps 70 and 72 pushing the inturned flanges 66 and 68 outwardly and bowing the flanges 62 and 64 outwardly. When the block 58 has cleared the inturned retaining flanges 66 and 68, the flanges 62 and 64 snap back to their original position with the retaining flanges 66 and 68 slidably holding the block 58 in the guideway 60.

A mounting bracket 74 forming a part of the connection between the control block 58 and the mirror casing 26 is formed as an integral part of the block 58, extending upward from the top surface of the block 58 and outwardly toward the opening 24 of the cavity 16. The bracket 74 has a rectangular support 76 extending upwardly from the top of the block 58 and a cylindrical member 78, having a longitudinal axis lying in the horizontal plane, integral with the support 76 and projecting toward the opening 24 of the cavity 16. A bore 80, with its centerline disposed in the horizontal plane, extends through the support 76 and is concentric to the cylindrical member 78 for slidably supporting therein a shaft 82. The shaft 82 made of plastic or metallic material, forms on its projecting end a coupling 84 defined by an enlarged diameter portion 85 of the shaft 82 disposed between the front of the member 78 and the rear surface 44 of the casing 26.

An integral substantially conical projection 86 having a substantially sharp point 88 protrudes from approximately the center of the rear surface 44 of the mirror casing 26. The projection 86 is thus preferably formed from plastic, but it may be provided with a metal cap. The projection 86 engages a conically shaped pocket 90 formed in the end face of the enlarged diameter portion 85 of the shaft 82. The innermost portion 92 of the pocket 90 is shaped so as to conform with the sharp point 88 of the projection 86. The pocket 90 slopes outward from portion 92 at a greater rate than the projection 86 slopes inwardly toward the end 88 so as to form a space 95 between the pocket 90 and the projection 86 to allow the projection to swivel on its end 88 in the pocket 90. As described, the coupling 84 is slidably mounted on the support 78 by means of the bore 80 and the shaft 82. A coil spring 94 is positioned about the support 78 has one end abutting the surface 96 formed at the junction of supports 76 and 78 and the other end abutting the surface 98 formed at the junction of the shaft 82 and the coupling 84 so as to urge the coupling 84 away from the support 76 toward the opening 24 which, in turn, urges the casing 26 toward the opening 24 in maintaining the cables 38, 40 and 42 in tension. The spring 94 maintains the components tightly engaged, resulting in a rattle-free, zero-backlash construction.

Referring to FIGS. 2 and 3, as the control block 58 slides up and down in the guideway 60, the coupling 84 is moved up and down, resulting in the projection 86 being moved with the coupling 84. With the control block 58 in a center position the coupling 84 and projection 86 would be in position A, with the mirror casing 26 and the mirror 22 lying substantially in a vertical plane, as shown in FIG. 3. When the block 58 is moved up, the coupling 84 and the projection 86 are moved to position B. As the projection 86 is moved to position B, the casing 26 is shifted upward, resulting in cables 38, 40 and 42 being shifted from position A to position B. The coil spring 94 pushes the casing 26 by means of the projection 86 and the coupling 84 toward the opening 24 of the cavity 26, constantly maintaining the three cables in tension. As the casing 26 is shifted upward to position B, the cable 38 pivots upward about its attachment 52, to the housing rear wall 46, allowing the end 53 of the cable 38 to move upward and outward toward the opening 24. As the end 53 moves outward the upper portion of the casing 26 moves outward. Further, as the casing 26 shifts upward, the cables 40 and 42 pivot upwardly about reference point 100, as shown in FIG. 3, resulting in the reference point 102 moving upwardly and back towards the rear wall 46. As the point 102 moves back the lower portion of the casing 26 and the mirror 22 move upward and rotate counterclockwise about the horizontal axis of rotation 23, resulting in the mirror 22 facing slightly downward.

With the casing again at position A, when the block 58 is moved downward in the guideway 60, the coupling 84 and the projection 86 are shifted from position A to position C. In moving from position A to position C, the cable 38 is pivoted downward about its attachment point 52 to the housing rear wall 46 moving the end 53 down and back towards the rear wall 46, pulling the upper portion of the casing 26 back toward the rear wall 46. The cables 40 and 42 are pivoted downward about point 100, moving the point 102 down and out towards the opening 24, resulting in the lower portion of the casing 26 being moved outward toward the opening 24. Thus, in shifting from position A to position C the casing 26 and the mirror are moved downward and rotated clockwise about the horizontal axis of rotation 23, so that the mirror 22 faces slightly upward. A pair of cylindrical stops 103 and 105 extend outward from the housing rear wall 46, preventing excessive rotation of the mirror casing 26 about axis 23.

Referring to FIGS. 2 and 4, the control block 58 is formed with a vertical bore 104 extending part way through the block from the top thereof. A bore 106 having a larger diameter than the bore 104 and having the same centerline as the bore 104 extends from the lower end of the bore 104 downward through the rest of the control block 58. A control pulley 108, preferably formed from metal, has a vertically disposed shaft 110 projecting downward from the lower side of a pulley element 112 rotatably mounted in the bore 104. The shaft 110 has a pair of longitudinally extending slits at right angles to one another, shown at 114 and 115, extending upward for most of its length from its free end 116. The free end 116 is formed with outwardly slanting ramps 118, forming a retaining flange 120, such that the shaft 110 can be pressed into the bore 104 with the aid of ramps 118 squeezing the shaft 110 together by means of the slits 114. When the end 116 has cleared the smaller diameter bore 104 and passed into the larger bore 106, the shaft 110 springs outwardly back to its original shape with retaining flanges 120 engaging the bottom surface of the bore 104, thereby rotatably retaining the control pulley 108 within the bore 104. The top element 112 of the control pulley 108 has a horizontally disposed V-shaped surface 122 encircling the element 112. A cable 124, preferably formed from rubber, has its two ends embedded in projections 126 and 128 which extend from the rear surface of the casing 26 adjacent its opposite vertical sides. The midportion of the cable 124 is stretched over the V-shaped surface 122 so that as the pulley 108 is rotated the cable shifts the position of the casing 26 about the axis 25. As illustrated in FIG. 4, starting with the casing 26 in position D, as the control pulley 108 is rotated clockwise in length of the portion of the cable 124 between the pulley 108 and the projection 126 is shortened, resulting in a force being exerted on the casing 26 rotating the casing clockwise about axis 25 to position E. If the control pulley 108 is rotated in the counterclockwise direction, the casing 26 rotates about axis 25 from position E to position D. If the pulley 108 is further rotated in the counterclockwise direction, the casing 26 is further rotated to position F. Thus, as the pulley 108 is rotated clockwise the casing 26 and the mirror 22 are rotated clockwise about the vertical axis of rotation 25, counterclockwise rotation of the pulley 108 results in the casing 26 and the mirror 22 rotating counterclockwise about the vertical axis of rotation 25. A pair of stops 131 and 133 extending from the rear surface 46 prevent excess rotation of the mirror casing 26 about axis 25.

Referring to FIGS. 1 and 2, the control cable 20 has one end secured in bore 134 of the control pulley 108 as by cementing, bonding or any other conventional means. The cable 20 extends from the cavity 16 through a bore 136 formed part way through the base 14 from the cavity 16. A second bore 138 of larger diameter than the bore 136 and having the same centerline extends from the end of the bore 136 the rest of the way through the base 14. A sheath 140 encasing the cable 20 has one end 142 disposed within the bore 138 abutting the surface 144 formed at the juncture of the bores 136 and 138. As shown in FIG. 2 and 5, a rod 146 extending from the end 142 of the sheath 140 is disposed in a slot 148 formed in the side of the bore 136, preventing the sheath 140 from rotating in bore 138. A hook 150 formed on the free end of the rod 146 clamps around the upper edge of the bore 136, preventing the sheath from being pulled out of the bore 138. The engagement of the end of the sheath 140 on the surface 144 prevents the sheath 140 from being pushed further into the bore 138. Thus, the sheath 140 may be readily snapped into place within the bore 138, with the engagement of the rod 146 in the slot 148 preventing the end 142 from rotating and the surface 144 and hook 150 preventing the lateral movement of the end 142.

The other end of the cable 20 is slidably mounted through the bore 152 of a tubular member 153 fastened to the mounting bracket 154 of the remote control 18 and is secured as by soldering, cementing or by other convenient means in the bore 156 of a control knob 158. The bore 152 extends part of the way through the center of the tubular member 153 with a larger diameter bore 162 extending the rest of the way through the tubular member 153. An important aspect of the invention is a friction element of any conventional design provided in the bore 152 for maintaining the position of the cable 20 therein, once the position has been manually set. The friction element maintains the mirror 22 in a set position by preventing the motion of the cable 20. The end 164 of the sheath 140 is disposed within the bore 162 and maintained therein by crimping the bore 162 at 166 around the sheath. A set screw may alternately be used instead of the crimp 166 to prevent the end 164 of the sheath from rotating or moving laterally with respect to the tubular member 153. A mounting flange 168 carries a pair of screws 170 and 172 for securing the bracket 154 to the inner surface of the structure forming the passenger compartment of the motor vehicle The knob 158 is movably mounted by means of the cable 20 relatively to the bracket 154, so that the knob 158 may be moved longitudinally with respect to the bracket 154 and rotated about the axis of elongation of the bore 156.

As the knob 158 is pulled away from the bracket 154, the cable 20 is pulled through the bracket 154, resulting in the end of the cable 20 attached to the control pulley 108 pulling the pulley downward an amount equal to the longitudinal displacement of the knob 158. As the pulley 108 is pulled downward, the control knob 58 is pulled downward in the guideway 60, resulting in the coupling 84 and the projection 86 being moved downward, rotating the mirror 22 clockwise about the horizontal axis of rotation 23 by the shift in position of the cables 38, 40 and 42 as illustrated in FIG. 3.

If the knob 158 is pushed toward the bracket 154, the cable 20 is pushed toward the cavity 16, resulting in the control pulley 108 being pushed upward by the cable 20. As the pulley is pushed upward, the control block 58 moves upward in the guideway 60, resulting in the coupling 84 and the projection 86 being pushed upward, rotating the mirror 22 counterclockwise about the horizontal axis of rotation 23 by the shift in position of the cables 38, 40 and 42.

When the knob 158 is rotated about the centerline of the bore 156, the cable 20 is likewise rotated. The rotation of the cable rotates the control pulley 108, which is engaged with the cable 124, as shown in FIG. 4. When the pulley 108 is rotated, the position of the engagement of the pulley 108 on the cable 124 is shifted, resulting in the cable 124 exerting a force on the mirror casing 26 and the mirror 22 about the vertical axis of rotation 25.

Thus, as the knob 158 is longitudinally displaced, in a push-pull manner, the mirror 22 is rotated about the horizontal axis of rotation 23, and as the knob is rotated the mirror 22 is rotated about the vertical axis of rotation 25. It is obvious that the control knob 158 may be simultaneously pushed rotated or pulled and rotated to orient the mirror in any desired plane.

A resilient, toroidal shaped diaphragm 174, preferably made of rubber, may be connected between flange 28 and the surface of the cavity 16, with one edge secured to the outer surface of the flange 28, as by cementing or bonding, and the other edge cemented or bonded to edge of the cavity 16. The diaphragm 174 does not hinder the movement of the casing 26 with respect to the housing 12, but prevents water and dirt from penetrating behind the casing 26 and interfering with the operation of the mechanism contained in the cavity.

It is to be noted that the preferably plastic construction of most of the major components of the assembly provide a quick snap-in construction of the assembly, eliminating much of the expense in the construction.

Having thus described the invention by claim of example given for illustrative purposes only, what we claim as new is:

1. A remote-controlled mirror for an automotive vehicle, comprising:
   a support structure having a base for mounting said structure on the vehicle;
   a mirror having a reflective side and a nonreflective side, said mirror being movable mounted in said support structure;
   control means slidably and rotatably mounted in said support structure and connected to the nonreflective side of said mirror for changing the plane of orientation of said mirror on movement of said control means, and
   a remote control connected to said control means for moving said control means, wherein said control means is adapted to pivot said mirror about a first axis contained in the plane of said mirror, and to pivot said mirror about a second axis contained in the plane of said mirror and disposed substantially at right angle from said first axis, and
   wherein said control means comprises a control block slidably mounted on said support structure and a control pulley rotatably mounted on said control block.

2. A remote-controlled mirror as defined in claim 2, wherein said control block comprises a pivotable connection between said mirror and said control block for pivoting said mirror about said first axis contained in the plane of said mirror upon sliding motion of said control block.

3. A remote-controlled mirror as defined in claim 2, wherein said control pulley is connected to said mirror for pivoting said mirror about said second axis contained in the plane of said mirror and disposed at substantially a right angle to said first axis upon rotary motion of said control pulley.

4. A remote-controlled mirror as defined in claim 6, wherein said control means includes:
   a cable engaging said control pulley and having its two ends connected to the nonreflective side of said mirror at opposed edges thereof for pivoting said mirror about said second axis upon rotation of said control pulley.

5. A remote-controlled mirror as defined in claim 3, wherein said remote control includes a movably mounted control knob and a single flexible nonextensible cable connected between said control knob and said control pulley and operative to rotate said control pulley upon rotation of said control knob and slidably move said control block upon lateral displacement of said control knob.

6. A remote-controlled mirror as defined in claim 2, wherein said pivotable connection comprises:
   a cone-shaped projection connected to said mirror and extending outward from the nonreflective side of said mirror; and
   a coupling element slidably mounted on said control block and having a cone-shaped pocket formed thereon for pivotably engaging said cone-shaped projection, said coupling element being spring loaded for urging said mirror away from said control block.

7. A remote-controlled mirror as defined in claim 6, wherein said control means comprises:
   three cables connected between the nonreflective side of said mirror and said support structure, said cables being connected to the nonreflective side of said mirror at three points equally spaced about said cone-shaped projection, and said cables extending away from said nonreflective side and outwardly from said cone-shaped projection to said support structure.

8. A remote-controlled mirror as defined in claim 7, wherein said spring-loaded coupling element maintains said three cables in tension during sliding motion of said control block.

9. A remote-controlled mirror as defined in claim 1, wherein said remote control includes a movably mounted control knob and a single flexible nonextensible cable connected between said control means and said control knob and operative to rotate said control means upon rotation of said control knob and slidably move said control means upon longitudinal displacement of said control knob.

10. A remote-controlled mirror as defined in claim 1, and including a diaphragm sealed between the outer edge of said mirror and said support structure.

IES-105-A

UNITED STATES PATENT OFFICE
CERTIFICATE OF CORRECTION

Patent No. 3,592,074          Dated July 13, 1971

Inventor(s) Carl M. Petersen, III et al

It is certified that error appears in the above-identified patent and that said Letters Patent are hereby corrected as shown below:

IN THE SPECIFICATION

Column 2, line 17, insert --by a-- after "supported"

Column 2, line 33, change "flanges" to -- flange --

Column 2, line 45, correct "THE" to -- the --

Column 3, line 61, change reference numeral "26" to "16"

Column 5, line 33, insert a period (.) after "vehicle".

Column 5, line 43, change "knob" to -- block --

Column 5, line 69, insert -- and -- after "pushed"

Column 5, line 75, insert -- the -- after "to"

Column 6, line 10, change "claim" to -- way --

IN THE CLAIMS

Column 6, line 33, change "2" to -- 1 --

Signed and sealed this 11th day of January 1972.

(SEAL)
Attest:

EDWARD M. FLETCHER, JR.　　　　　ROBERT GOTTSCHALK
Attesting Officer　　　　　　　　Acting Commissioner of Patents

FORM PO-1050 (10-69)